United States Patent
Laughman et al.

(10) Patent No.: US 10,767,887 B2
(45) Date of Patent: Sep. 8, 2020

(54) SYSTEM AND METHOD FOR THERMAL COMFORT CONTROL

(71) Applicant: Mitsubishi Electric Research Laboratories, Inc., Cambridge, MA (US)

(72) Inventors: Christopher Laughman, Waltham, MA (US); Scott A. Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 155 days.

(21) Appl. No.: 16/013,083

(22) Filed: Jun. 20, 2018

(65) Prior Publication Data
US 2019/0353384 A1    Nov. 21, 2019

Related U.S. Application Data

(60) Provisional application No. 62/672,122, filed on May 16, 2018.

(51) Int. Cl.
*F24F 11/70* (2018.01)
*F24D 19/10* (2006.01)
*F25B 49/02* (2006.01)

(52) U.S. Cl.
CPC .......... *F24F 11/70* (2018.01); *F24D 19/1012* (2013.01); *F25B 49/02* (2013.01)

(58) Field of Classification Search
CPC ...... F24F 11/70; F24F 5/0089; F24F 2221/18; F24F 2110/10; F24F 11/63; F25B 49/02; F24D 19/1012; G05D 23/1919
See application file for complete search history.

(56) References Cited

U.S. PATENT DOCUMENTS

| 5,170,935 A | 12/1992 | Federspiel et al. |
| 7,849,700 B2 | 12/2010 | Seefeldt |

(Continued)

FOREIGN PATENT DOCUMENTS

| CN | 104613597 A | * | 5/2015 |
| CN | 207299405 U |   | 5/2018 |

(Continued)

OTHER PUBLICATIONS

Futaki et al., Hot Heat Environment Control System, Jan. 6, 1992, JPH04142A, Whole Document (Year: 1992).*

(Continued)

*Primary Examiner* — Larry L Furdge
(74) *Attorney, Agent, or Firm* — Gennadiy Vinokur; James McAleenan; Hironori Tsukamoto

(57) ABSTRACT

A thermal conditioning system for controlling a thermal comfort of an occupant of a building includes a vapor compression system to control an air temperature in the building space and a radiant system to control a radiant temperature in the building space. The system also includes a feedback controller to generate a first control signal for controlling a state of the vapor compression system to reduce an error between a set-point air temperature and a current air temperature in the building space and includes a feedforward controller to generate a second control signal control for controlling a state of the radiant system based on the state of the vapor compression system.

15 Claims, 7 Drawing Sheets

(56) References Cited

U.S. PATENT DOCUMENTS

| | | |
|---|---|---|
| 7,966,104 B2 | 6/2011 | Srivastava et al. |
| 8,965,587 B2 | 2/2015 | Modi et al. |
| 9,025,942 B2 | 5/2015 | Kamiyama |
| 2009/0005912 A1 | 1/2009 | Srivastava et al. |
| 2014/0048244 A1 | 2/2014 | Wallace |
| 2017/0314828 A1 | 7/2017 | MacPherson |
| 2017/0268795 A1* | 9/2017 | Yamamoto ............... F24F 11/89 |

FOREIGN PATENT DOCUMENTS

| | | | |
|---|---|---|---|
| EP | 0915301 A2 | | 5/1999 |
| EP | 2990890 A2 | | 3/2016 |
| JP | H04142 A | * | 1/1992 |
| JP | 2013092327 A | * | 5/2013 |
| WO | 2012114461 | | 2/2011 |

OTHER PUBLICATIONS

Wang et al., Efficient Energy Saving Air Conditioning Unit Control Method . . . , May 13, 2015, CN104613597A, Whole Document (Year: 2015).*

Takahashi et al., Air Conditioning Heat Source System for Building, May 16, 2013, JP2013092327A, Whole Document (Year: 2013).*

\* cited by examiner

SYSTEM AND METHOD FOR THERMAL COMFORT CONTROL

TECHNICAL FIELD

This invention relates generally to control of thermal comfort in buildings and more particularly to controlling concurrently different factors of the thermal comfort of a person in a building.

BACKGROUND

Thermal comfort greatly impacts a person's productivity and general well-being. Systems that automatically maintain indoor thermal conditions, including heat pumps, refrigeration and/or air-conditioning systems, can provide suboptimal thermal comfort in an energy inefficient manner, often because they are poorly controlled.

For the most part, communication with the thermal conditioning systems take place by either a wall thermostat or a remote control device, whose purpose is to turn the equipment on or off, and set temperature set-points. The on/off switch indicates when service is needed and when it is not. The temperature setting is a way of indicating a desired level of thermal comfort, in accordance with the needs and thermal condition of building occupants. In principle, the conventional thermal conditioning systems should be able to provide thermal comfort, when possible. However, in practice, this may not happen, due to a number of reasons.

For example, occupant(s) of a building rarely know the optimal value of their thermal comfort. That value depends on the current level of physical activity, respectively metabolic rate, the humidity of air, and the clothing worn by the occupant(s). For example, when an office worker has been sitting still at a desk for a long period of time on a cold winter day, the worker is likely to feel cold due to a lower metabolic rate, and request more heating by increasing the temperature set-point. Similarly, when a manual laborer has been performing vigorous physical work on a hot and humid summer day, the worker is likely to feel very hot, and can request more cooling by lowering the temperature set-point. In such a manner, the occupants can overestimate or underestimate their need for thermal comfort, which can lead to dissatisfaction and the inefficient use of thermal conditioning systems.

One way to address this problem is to take the control out of the hands of the occupants of the premises. For example, some methods aim to develop thermal models that are used to automatically sense and control the thermal comfort of the occupants. See, e.g., U.S. 2016/0320081. However, the thermal model creation can be a tedious and uncertain process.

Accordingly, there is still a need to develop new strategies and methods to improve the thermal comfort of building occupant(s), which do not depend on data that are not easily accessible.

SUMMARY

Some embodiments are based on recognition that many building HVAC systems control only the air temperature as a surrogate for thermal comfort, but air temperature and thermal comfort are not equivalent. In general, the thermal comfort of a given occupant or set of occupants in a building space depends on a several factors such as the temperature and humidity of the air, the temperature of solid materials within the indoor environment, the velocity of the air, and the metabolic rate and amount of clothing worn by the occupant(s).

For example, thermal comfort is achieved when an individual is in thermal equilibrium with their surroundings. Two general categories of factors affect the thermal interactions of an individual with his environment: factors internal to the occupant, such as metabolic rate, clothing insulation, and psychological parameters, and factors external to the occupant, which include building space air temperature, mean radiant temperature, air speed, and relative humidity.

Because these variables are difficult to measure directly in a cost-effective manner, most HVAC systems do not attempt to regulate the thermal comfort of the occupants in a building space. As many HVAC systems are mostly effective at regulating only one of the set of variables that influence thermal comfort, conventional HVAC systems regulate a single variable to a set-point, and assume that this one variable is an adequate surrogate for thermal comfort. For example, many vapor-compression heat pumps and air-conditioning systems directly regulate only the building space air temperature because it is easy and inexpensive to measure, and these systems strongly affect the air temperature and possibly the air velocity. On the other hand, radiant heating and cooling systems exchange heat with their surrounding environment by radiative heat transfer, with some convection, and primarily affect the mean radiant temperature in a space, thereby affecting thermal comfort. For building occupant(s) in office conditions, meaning at low metabolic rates and wearing light clothing, the mean radiant temperature affects human comfort just as much as the air temperature.

Some embodiments are based on the realization of this discrepancy between what occupant can control (e.g., air temperature) and what occupant wants to achieve (e.g., thermal comfort). For example, a common scenario in a heating application is that in which the building space occupant sets the building space air temperature to be several degrees higher than what is actually needed to achieve thermal comfort because a heat pump can only affect the air temperature over user's timescales, whereas the occupant could be comfortable with a lower air temperature if the mean radiant temperature could also be increased. In fact, when the radiant temperature is low, the occupants have a tendency to overcompensate for the low radiant temperatures with excessively high values of air temperature. This practice tends to be energy inefficient, increases maintenance cost, and reduces the life span of the vapor compression system. Moreover, the disparity between the variable under control (e.g., the air temperature) and the sense of thermal comfort can confuse the occupant and complicate her selection of set-points to control thermal comfort via a single external factor.

Some embodiments are based on realization that it is beneficial to allow an occupant of an environment to manage their thermal comfort in that environment by controlling multiple external factors that influence their comfort. For example, out of these four above-mentioned external factors, it is often desired to control concurrently at least the air temperature and the radiant temperature, due to the fact that the radiant temperature and the air temperature comprise the two most significant contributions to the external factors relating to thermal comfort. Some embodiments are based on recognition that control of those two external factors can reduce the overall cost of operating the thermal conditioning system while giving an occupant improved control of the thermal comfort itself.

To that end, in some embodiments, a thermal conditioning system includes at least two subsystems that include a vapor compression system and a radiant system that are arranged to condition the same building environment. For example, a thermal conditioning system of one embodiment includes an air-source heat pump and a hydronic radiant heating and cooling system. This combination is advantageous for residential and industrial buildings due to its ability to provide thermal comfort at a lower temperature difference between the environment and the working fluid, which results in higher energy efficiency. In some embodiments, these radiant systems are integrated into building constructions, such as water pipes that are embedded in a concrete slab, while other embodiments incorporate water pipes on the surface of the material or alternately employ electric heating elements. In some embodiments, the purpose of this system is to heat the occupied space, while in other embodiments, the purpose of this system is to cool the occupied space.

The concurrent control of the vapor compression system and the radiant system in a building can be challenging for two main reasons. The first of these reasons is that, while the vapor compression system can control the air temperature quickly and accurately, its ability to quickly change the mean radiant temperature in the occupied space is much more limited. This is due to the large thermal inertia of the building materials and other solid objects in the occupied space, and that the vapor compression system changes the temperature of the air, which in turn changes the temperature of these materials through the process of convective heat transfer, which is a slower dynamic. Thus, in a number of situations when an occupant changes the temperature set-point, the air temperature changes quickly, while the mean radiant temperature changes much slower, and the level of desired comfort is achieved only on a very slow time-scale.

The second challenge faced is that radiant systems often overshoot or undershoot the desired temperature set-point following a set-point change. This is because radiant system directly heats a building material, which in turn heats the air, and the building material has a higher heat capacity than the air. When conventional on-off type of control is used, which is typical in a conventional thermostat, then the radiant system heats the building material to a higher temperature than the air, causing an overshoot of the air temperature set-point. This wastes energy and is detrimental to human comfort.

In addition, while the vapor-compression system can often be controlled to reduce an error between a set-point air temperature and a measurement of air temperature, the analogous control of the mean radiant temperature using the radiant system is also not usually achievable because it is difficult to measure directly the mean radiant temperature. As a result, while the objective of using both the heat pump subsystem and the radiant subsystem is to improve thermal comfort, the poor use of control can result in reduced thermal comfort in comparison with what may be possible with a single system. It is therefore advantageous that the control of the overall thermal conditioning system take into account the dynamics of especially the mean radiant temperature, which is influenced primarily by the large thermal inertia and heat capacity of building materials, and the dynamic interactions between subsystems.

Some embodiments are based on the realization that when the air temperature and the radiant temperature positively correlated with the thermal comfort objective so that their values should move dependently toward the common objective. The relationship between the air and radiant temperatures can be linear or non-linear, and the concept of this relationship is used herein broadly to indicate that if an occupant desires to increase (decrease) the air temperature, the occupant also desires to increase (decrease) the radiant temperature. Similarly, if the occupant is comfortable with the air temperature, this relationship suggests that the occupant is comfortable with the radiant temperature as well.

To that end, in some embodiments, the vapor compression system is controlled by a feedback controller to reduce an error between an air temperature set-point and an air temperature measurement in the environment defining a state of the vapor compression system, while the radiant system is controlled by a feedforward controller based on the state of the vapor compression system. Such a coordinated control allows to decouple specifics of different controls of two different systems, while coupling the objectives of their operations. In addition, this coupling ensures stability of the feedback loop with high robustness margins, allows to reuse the legacy controller of the vapor compression system, and simplifies the control of the radiant system by eliminating the need for an additional feedback controller and the need to measure or estimate radiant temperature. The coordinated control does not require a predictive model of the thermal behavior of the occupied space, and requires no additional sensing or information beyond what is used by the legacy vapor compression system. Moreover, the correlated control can increase building occupant thermal comfort by reducing the rise-time of the measured temperature, defined as the time duration between the time at which a set-point change occurs, and the time at which the set-point temperature is achieved, compared with a system that uses only a radiant heating system or only a vapor-compression system. In addition, the coordinated control can reduce the rise-time of the mean radiant temperature, although it is not necessary to directly measure the mean radiant temperature. This results in improved human comfort.

In some embodiments, the vapor compression system includes one or combination of the variable speed compressor and the variable position valve. In these embodiments, the feedback controller determines the speed of the compressor and/or the opening of the valve. Some embodiments are based on realization that the control signal to control the radiant system can be determined as a function of the control signal for controlling the vapor compression system. Such a determination allows to automatically determining the state of the radiant system and specific control inputs to components of the radiant system.

In some embodiments, the vapor compression system includes one or more constant-speed compressors. In these embodiments, the feedback controller modulates the on-off cycle of the compressor using various methods of compressor modulation. In some embodiments, the radiant system includes one or more constant-value actuators such as a constant speed pump, and the control signal to control the radiant system can be determined as a function of the control signal for controlling the vapor compression system, and modulates the on-off cycle of the radiant system.

Some embodiments are based on recognition that, in a building, the thermal inertia of the radiant system is higher than the thermal inertia of the vapor compression system. Hence, the radiant system can be controlled based on a low-frequency component of the control signal for the vapor compression system. To that end, some embodiment include a low-pass filter to process the control signal for the vapor compression system to produce a low-frequency control signal for controlling the radiant system. This embodiment reduces the complexity of the feedforward controller while ensuring the correlation between operation of the vapor compression system and the radiant system.

In addition, some implementations remove the low-frequency control signal from the original control signal of the vapor compression system to control the vapor compression system only using the high-frequency component of the control signal. This implementation takes advantage of different dynamics of the vapor compression system and the radiant system to reduce the duplication of the control while ensuring the correlated operation. For example, one embodiment includes a subtractor to subtract the low-frequency control signal from the first control signal to produce a high-frequency control signal and to control the vapor compression system according to the high-frequency control signal.

Accordingly, one embodiment discloses a thermal conditioning system for controlling a thermal comfort of a building occupant, including a vapor compression system to control an air temperature in the building space; a feedback controller to generate a first control signal for controlling a state of the vapor compression system to reduce an error between a set-point air temperature and a current air temperature in the building space; a radiant system to control a radiant temperature in the building space; and a feedforward controller to generate a second control signal control for controlling a state of the radiant system based on the state of the vapor compression system.

Yet another embodiment discloses a thermal conditioning method for controlling a thermal comfort of a building occupant. The method includes generating a first control signal for controlling a state of a vapor compression system to reduce an error between a set-point air temperature and a current air temperature in the building space; generating a second control signal control for controlling a state of the radiant system based on a function of the first control signal; and controlling concurrently a vapor compression system to control an air temperature in the building space based on the first control signal and a radiant system to control a radiant temperature in the building space based on the second control signal.

Definitions

In describing embodiments of the invention, the following definitions are applicable throughout (including above).

A "vapor compression system" refers to a system that uses the vapor compression cycle to move refrigerant through components of the system based on principles of thermodynamics, fluid mechanics, and/or heat transfer. The vapor compression systems can be, but are not limited to, a heat pump, refrigeration, and an air-conditioner system. Vapor compression systems are used in applications beyond the conditioning of residential or commercial spaces. For example, vapor compression cycles can be used to cool computer chips in high-performance computing applications.

A "radiant system" refers to a system that supplies heat directly to the building materials such as the concrete floor, and heats the space and occupants mainly through radiant heat transfer. The radiant system uses a medium of heat transfer such as hot or cold water that runs through pipes that are embedded in the building material, but could also use electrical heating wires or heat exchangers connected to a vapor compression machine.

An "HVAC" system refers to any building heating, ventilating, and air-conditioning (HVAC) system implementing the vapor compression cycle. HVAC systems span a broad set of systems, ranging from systems which supply only outdoor air to the occupants of a building, to systems which only control the temperature of a building, to systems which control the temperature and humidity.

"Components of a vapor compression system" refer to any components of the vapor compression system having an operation controllable by the control systems. The components include, but are not limited to, a compressor having a variable speed for compressing and pumping the refrigerant through the system; an expansion valve for providing a pressure drop between the high-pressure and the low-pressure portions of the system, and an evaporating heat exchanger and a condensing heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor compression system.

An "electrical circuit" refers to an interconnection of wires that transmits electrical signals among components, such as processors, memory, or actuators.

A "set-point" refers to a desired value of a variable, such as the building space temperature. The term set-point is applied to any particular value of a specific set of variables.

A "computer" refers to any apparatus that is capable of accepting a structured input, processing the structured input according to prescribed rules, and producing results of the processing as output. Examples of a computer include a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

A "controller," "control system," and/or "regulator" refer to a device or a set of devices to manage, command, direct or regulate the behavior of other devices or systems. The controller can be implemented by hardware, a processor with operation configured by the software, and combination thereof. The controller can be an embedded system.

DETAILED DESCRIPTION

Figure 1:
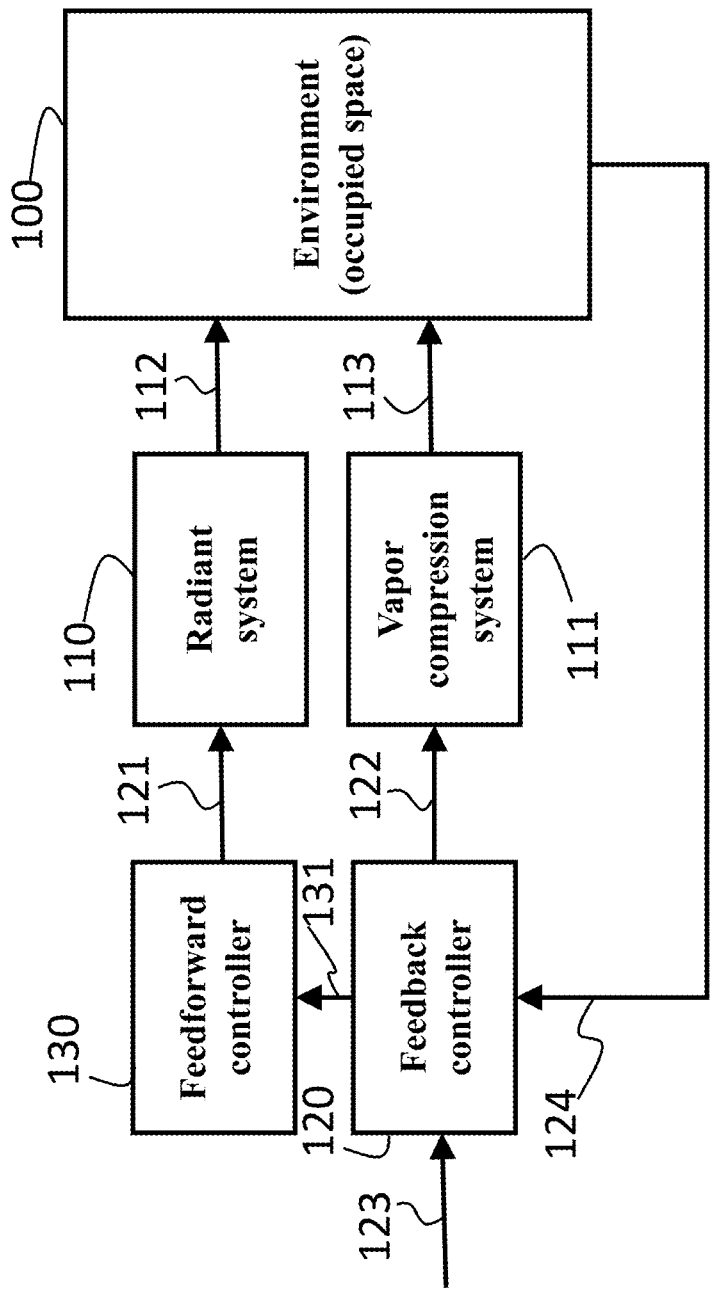
FIG. 1 shows a block diagram of a thermal conditioning system for controlling a thermal comfort of a building occupant according to some embodiments.

Thermal comfort is the condition of mind that expresses satisfaction with the thermal environment. Most people feel comfortable at space air temperature, colloquially a range of temperatures around 20 to 22° C. (68 to 72° F.), but this range may vary greatly between individuals and depending on factors such as activity level, clothing, and humidity.

Some embodiments are based on recognition that the thermal comfort can be achieved when the thermal neutrality is maintained and the heat generated by human metabolism is allowed to dissipate, thus maintaining thermal equilibrium with the surroundings. The factors that influence thermal comfort are those that determine heat gain and loss, which can be broadly divided into two categories. The first category includes factors internal to an occupant, such as metabolic rate, clothing insulation, and psychological parameters, e.g., individual expectations and/or preferences of the occupant. The internal factors are under control of the occupants themselves.

The second category includes external factors, such as air temperature, mean radiant temperature, air speed, and relative humidity. Potentially those external factors can be controlled by the thermal conditioning systems, but in practice, various thermal conditioning systems control only one external parameter out of many. For example, vapor compression systems, such as heat pumps, refrigeration and air-conditioning systems, are widely used in industrial and residential applications to directly control only the air temperature. Similarly, radiant heating and cooling systems that exchange heat with their surrounding environment through convection and radiation to directly control the radiant temperature.

Some embodiments are based on observation that when only one external factor is under control of the occupants of the premises, the occupants can have a tendency to overestimate or underestimate the value of the controlled factor required for their thermal comfort. For example, to achieve thermal comfort, an occupant can set a set-point temperature to 74° F. to regulate the temperature of the air, while the occupant would be perfectly comfortable with the temperature to 70° F. if the values of the radiant temperature could be increased. In fact, when the radiant temperature is low, the occupants have a tendency to overcompensate the low radiant temperatures with overly high values of air temperature, which is energy inefficient, increases maintenance cost, and reduces the life span of the vapor compression systems.

Some embodiments are based on realization that this problem is caused by discrepancy between what a building occupant can control and what a building occupant wants to achieve. Specifically, a building occupant would like to achieve her thermal control in consideration of her own internal factors, but is offered to control some external factor, such as air temperature that only indirectly related to the objective of the occupant. In other words, a single external factor, such as the air temperature or the radiant temperature alone, is not equal to the thermal comfort. This discrepancy can confuse the occupant and complicate her selection of set-points to control a single external factor of the thermal comfort.

Some embodiments are based on realization that it is beneficial to allow a building occupant to control the thermal comfort in that environment by controlling multiple external factors forming their comfort. For example, out of these four above-mentioned external factors, it is desired to control concurrently at least the air temperature and the radiant temperature. Some embodiments are based on recognition that control of those two external factors can reduce the overall cost of the thermal conditioning system while giving a building occupant control of the thermal comfort itself.

In such a manner, when different factors of thermal comfort are controlled together, the building occupants control not some external factor that they don't really care about, but their thermal comfort itself, with which there are intuitively more familiar and thus can more efficiently regulate, thereby reducing the need to develop additional thermal models.

To that end, in some embodiments, a thermal conditioning system is at least a dual-factor system that includes a vapor compression system and a radiant system arranged to condition the same environment. For example, a thermal conditioning system of one embodiment includes an air-source heat pump and a hydronic radiant heating and cooling system. This combination is advantageous for residential and industrial buildings due to its ability to provide thermal comfort at a lower temperature difference.

However, some embodiments are based on recognition that concurrent control of the vapor compression system and the radiant system is a challenging problem that potentially can destabilize the operation of such a dual-factor thermal conditioning system. In theory, the vapor compression system can be controlled to reduce an error between a set-point air temperature and the current air temperature, while the radiant system can be controlled to reduce an error between a set-point radiant temperature and the current radiant temperature. In practice, however, it is difficult to measure and/or estimate the radiant temperature.

In addition, it is inefficient to control the radiant system based on the air temperature due to loosely-coupled relationship between the air and the radiant temperature. Further, control of other parameters of the radiant system, such as temperature of the liquid passing through the hydronic radiant system, is sufficiently different from air temperature control and, thus, can destabilize the operations of the dual-factor thermal conditioning system.

Some embodiments are based on recognition that the air temperature and the radiant temperature are two independent variables that can be controlled independently. However, some embodiments are based on realization that when the air temperature and the radiant temperature are controlled with the thermal comfort objective in mind, those variables are correlated and their values should move dependently toward the common objective. The correlation between those air and radiant temperature variables can be linear or non-linear and used herein broadly to indicate that if an occupant desires to increase the air temperature, the occupant also desires to increase the radiant temperature. Similarly, if the occupant desires to decrease the air temperature, the correlation means that the occupant also desires to decrease the radiant temperature, and if the occupant is comfortable with the air temperature, the correlation provides that the occupant is comfortable with the radiant temperature as well.

Such a realization leads to understanding that the coordinated control of the vapor compression system and the radiant system to condition the same environment should be correlated as well. In other words, the radiant system should mimic at least a state of the vapor compression system. For example, the state of the vapor compression system includes ON and OFF state, and both the vapor compression system and the radiant system should either condition the environment together or not condition it at all.

FIG. 1 shows a block diagram of a thermal conditioning system for controlling a thermal comfort of an occupant of an environment in a building according to some embodiments. The thermal conditioning system includes a vapor compression system 111 to control an air temperature in the environment and a radiant system 110 to control a radiant temperature in the environment. Specifically, the vapor compression system 111 and radiant system 110 interact dynamically with the same occupied space of the environment, as is indicated by the arrows 112 and 113. Examples of the building include commercial and residential buildings. Examples of the environments in the building include rooms and other premises within the walls of the building.

Because of the interactions between these systems, the vapor compression system 111 is controlled by a feedback controller 120 generating a first control signal, e.g., inputs 122, to reduce an error between a set-point air temperature 123 and a current air temperature 124 in the environment defining a state 131 of the vapor compression system, while the radiant system 110 is controlled by a second control signal, e.g., inputs 121 generated by a feedforward controller 130 based on the state 131 of the vapor compression system. These control inputs are computed for both systems concurrently to manage the dynamic interactions between the systems and the occupied environment in the building.

The first control signal defines a movement of refrigerant in the vapor compression system. Examples of the first control signal include values of frequency or speed of the compressor of the vapor compression system, opening of an expansion valve of the vapor compression system, and combination thereof. The second control signal defines a radiant heat transfer of the radiant system. Examples of the second control signal include a frequency or speed of a motor moving water through the pipes of the radiant system, a temperature of the water and/or other radiating heat.

In some implementations, the second control signal defining the radiant heat transfer is a function of the first control signal. For example, the second control signal is a proportional (linearly or non-linearly) to the first control signal. In such a manner, the radiant heat transfer is in correlation, e.g., in proportion, with the movement of the refrigerant, e.g., in proportion to a mass of the refrigerant moving in the vapor compression cycle.

Such a correlated operation allows to decouple specifics of different controls of two different systems, while coupling the objectives of their operations. In addition, this coupling ensures stability of the feedback loop, allows to reuse the legacy controller of the vapor compression system, and simplifies the control of the radiant system reducing the need for an additional feedback controller and the need to measure or estimate radiant temperature. Moreover, the correlated control can increase satisfaction of the building occupants to achieve their thermal comfort and improve their set-points selection thereby reduce energy consumption and increasing the lifespan of the vapor compression and radiant systems.

In some embodiments, the state 131 of the vapor compression system and the state of the radiant system includes an OFF state and an ON state, wherein the feedforward controller matches the state of the radiant system to the state of the vapor compression system. In one implementation of these embodiments, the feedforward controller matches the state of the radiant system to the state of the vapor compression system. This allows controlling both system uniformly, in dependence of each other with minimal modification of the legacy systems.

Additionally or alternatively, in one embodiment, the state of the vapor compression system and the state of the radiant system includes an OFF state, a cooling state, and a heating state. During the cooling state, both systems cool the environment, and during the heating state, both systems heat the environment. In this embodiment, the feedforward controller matches the state of the radiant system to the state of the vapor compression system, while allowing to automatically control the mode of operation of the radiant system in dependence on the state of the vapor compression system.

Figure 2:
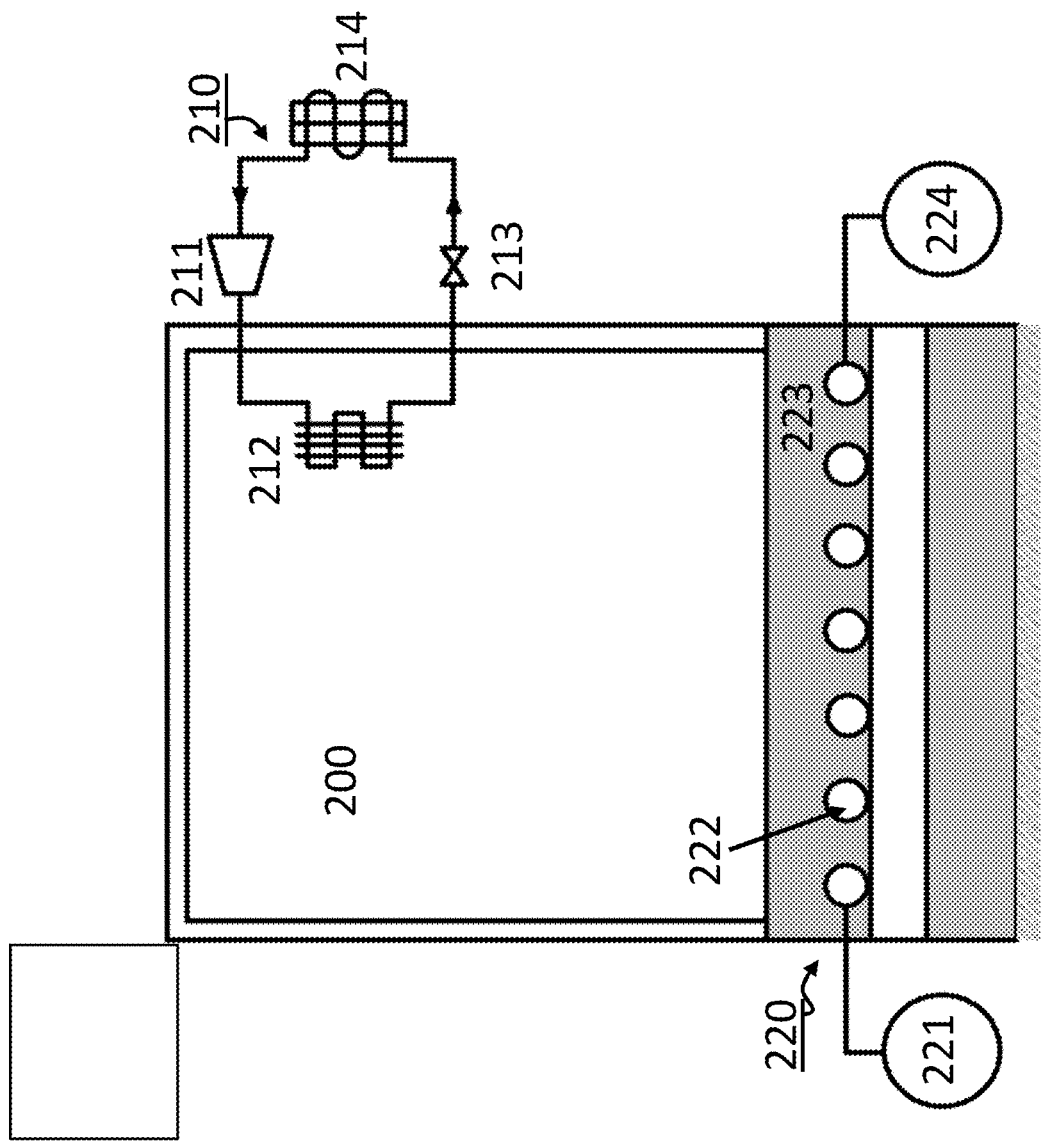
FIG. 2 shows a schematic of thermal conditioning system according to one embodiment.

FIG. 2 shows a schematic of thermal conditioning system according to one embodiment. In this embodiment, a building environment 200 is conditioned by both a heat pump (210) and a radiant system (220). The heat pump includes a compressor (211), and indoor heat exchanger (212), an expansion valve (213), and an outdoor heat exchanger (214), and the cycle operates in heating mode in which the indoor heat exchanger provides thermal energy to the occupied space and the outdoor heat exchanger absorbs thermal energy from the ambient environment.

In some implementations, the cycle provides heat to the occupied space in the following manner: the compressor (211), which takes in low pressure, low temperature refrigerant vapor and compresses it to a high pressure, high temperature vapor, which is delivered to a first heat exchanger (212), where the refrigerant cools to a high-pressure, lower temperature liquid and provides thermal energy to the space. After passing through the expansion valve (213), the refrigerant is low-pressure liquid or two-phase refrigerant, and the refrigerant evaporates as it travels through the second heat exchanger (214), absorbing thermal energy from the ambient environment so that the refrigerant leaves the outdoor heat exchanger in a low-pressure, low temperature vapor state and returns to the compressor. Other embodiments of this system include the heat pump operating in a reverse cycle, in which the indoor heat exchanger absorbs heat from the occupied space and thermal energy is rejected to the ambient environment, or a multi-zone heat pump in which there are possibly multiple indoor heat exchangers and/or multiple outdoor heat exchangers.

In one embodiment, the radiant system (220) includes a source of liquid water, or any other suitable liquid, (221) at temperature T1 at a pressure sufficient to drive the water through the set of tubes (222) embedded in a concrete slab (223). As water passes through the tubes, the water also provides thermal energy to the concrete slab (223), which in turn provides thermal energy to the building environment (200), so that the water leaves at temperature T2<T1, and returns to the sink (224). In one embodiment, a water heater serves as the source of warm water for the system, and the return water from the radiant system returns to the water heater and/or is mixed with the water supplied to the radiant heating system to manage the temperature of the water supplied to the radiant system. In other embodiments, this radiant heating system could also include water tubes that are located at the surface of the floor, or it could consist of electrical heating elements located at or near the surface of the floor as well.

Some embodiments allow to control the vapor compression system and the state of the radiant system operated by constant speed components, such as a constant speed of compressor of vapor compression system. However, the introduction of variable speed compressors, variable position valves, and variable speed fans to the vapor compression cycle has greatly improved the flexibility of the operation of thermal conditioning systems. Some embodiments are based on realization that it is possible to use these new components to improve the efficiency of vapor compression systems by controlling not only the correlation of the state of the system, but also an extent of this correlation.

For example, in some embodiments, the vapor compression system includes one or combination of the variable speed compressor and the variable position valve. In these embodiments, the feedback controller determines the speed of the compressor and/or the opening of the valve. Some embodiments are based on realization that the control signal to control the radiant system can be determined based on the state of the vapor compression system defined by a function of the control signal for controlling the vapor compression system. Such a determination allows to automatically determining the state of the radiant system and specific control inputs to components of the radiant system.

In various implementations, the function preserves the correlation of the control and/or the correlation of the controlled variables using predetermined correlation coefficient. Examples of the correlation coefficients include positive values of Pearson correlation coefficients and rank correlation coefficients among others.

Figure 3:
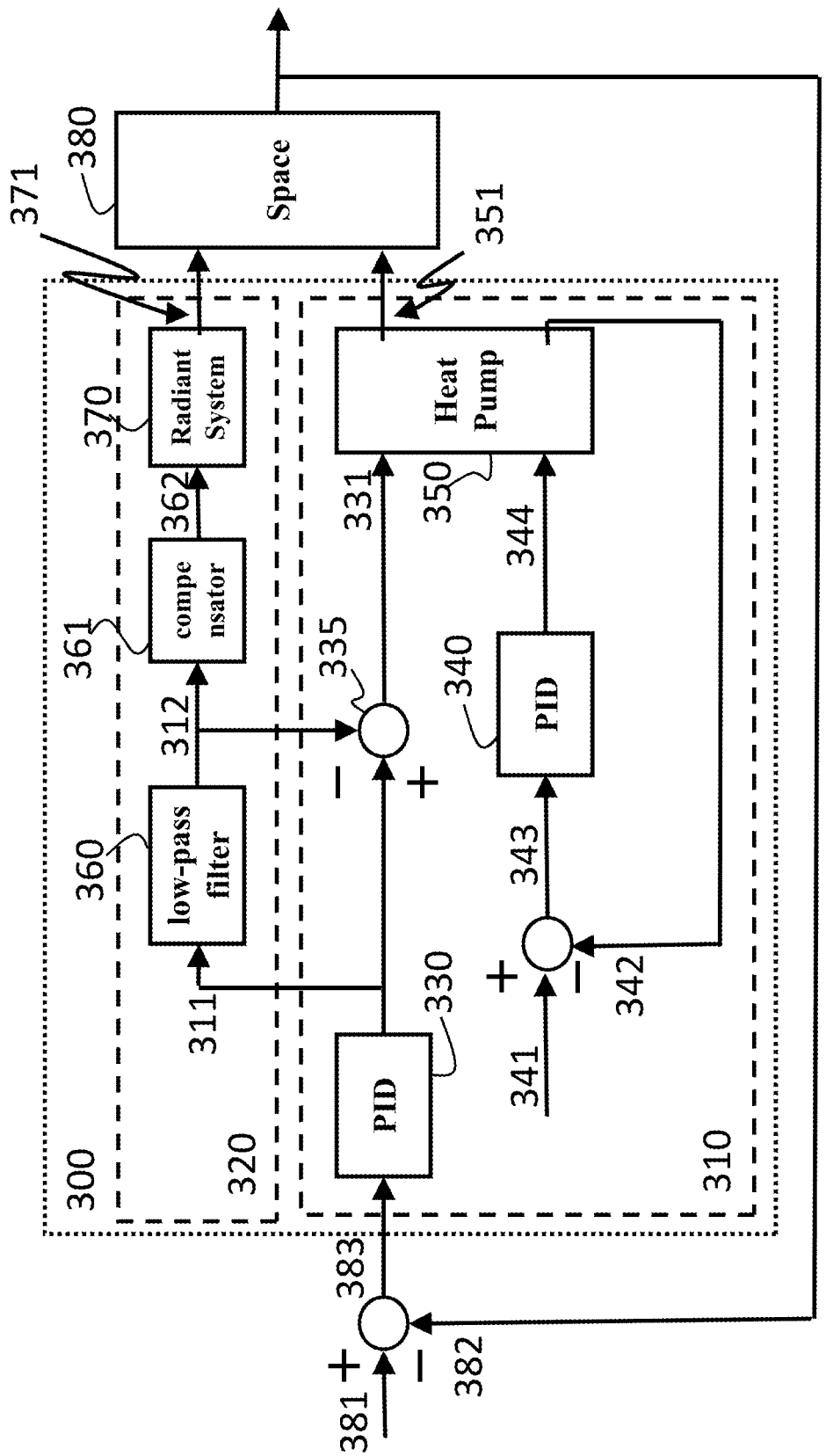
FIG. 3 shows a block diagram of a controller for controlling both the heat pump and the radiant system according to some embodiments.

FIG. 3 shows a block diagram of a controller 300 for controlling both the heat pump and the radiant system according to some embodiments. This controller can be decomposed into two interacting components: a controller for the heat pump (310) and a controller for the radiant system (320). The interactions between these controllers can be seen by arrows 311 and 312 that interchange information between these two component controllers. These controllers are discussed individually, after which the interactions between the controllers are described.

The heat pump controller 310 takes the error signal 383 between the user specified temperature set-point 381 and the measured building space air temperature 382 which is obtained from the building space 380. This error signal 383 drives a proportional-integral-derivative (PID) controller 330, which is designed to ensure the stable operation of the compressor speed of the heat pump. The output of the PID controller 311 is then combined with a signal 312 from the radiant system controller 320, which compensates for the lag-type behavior of the radiant system, due to the large thermal inertia and heat capacity of the building materials, and used to drive the compressor speed 331 of the heat pump 350. The difference between signals 311 and 312 is applied to the compressor speed because it allows the high-frequency components of the control signal 311 to drive the compressor frequency, due to the fact that the heat pump compressor speed can change the building space air temperature quickly.

The PID controller 330 is a feedback controller that allows simplifying the control of the heat pump 350 coordinated with the control of the radiant system 370 while avoiding or minimizing the coordinated control of the vapor compression system and a radiant system with Model Predictive Control (MPC). Some embodiments are based on recognition that MPC uses an identified dynamic model of the thermal behavior of the building space, together with optimization and logic in order to predict the thermal response and adjust the control variables in order to achieve a desirable thermal response, such as preventing temperature overshoot by the radiant system following a set-point change. However, model(s) that are identified from measured data may not be robust to changes in the building environment. For example, the model may be identified during one type of weather or indoor use condition, and may not be accurate for other situations. Furthermore, MPC as a general methodology is known to lack robustness guarantees that are associated with feedback control systems. Specifically, MPC can have very poor robustness margins, meaning that small deviations between the model and actual building physics can lead to instability of the closed-loop feedback system. Moreover, this approach may require additional measurements and/or information such as weather, which requires the use of an internet connection.

However, some embodiments are based on recognition that the air temperature and the radiant temperature are two independent variables that can be controlled independently. When the air temperature and the radiant temperature are controlled with the thermal comfort objective in mind, those variables are correlated and their values should move dependently toward the common objective, and the PID controller 330 can satisfy this common objective.

The heat pump 350 may also include one or more secondary control loops for regulating internal process variables, such as the evaporator superheat 342. In one implementation, this control loop is actuated on the difference (343) between a process set-point 341 and the measurement of that set-point 342. In one embodiment, the internal process variable used is the evaporator superheat, which is the difference between the measured temperature of the refrigerant leaving the evaporator and the saturation temperature corresponding to the pressure in the evaporator at which that refrigerant boils. This error signal 343 is then used to drive a second PID controller 340, which computes the input value for the expansion valve position 344 to ensure that the heat pump operates in a stable and reliable manner. In this embodiment, the process set-point 341 for this controller is chosen based upon knowledge of the physical requirements for the device; for example, for many heat pumps, it is desired that the evaporator superheat be controlled to a value of 2 degrees Celsius. The output of the heat pump is a first quantity of thermal energy 351 that is added to or removed from the occupied space 380.

However, other embodiments may lack an actuated expansion valve, and instead use a passive expansion device such as a capillary tube in which case the secondary control loop(s) are not required.

The radiant system controller 320 is driven by the output 311 of the first heat pump PID controller 330. The radiant system can include circuitry to control the radiant system based on the output 311. For example, if the feedback controller produces a first control signal 311 for the vapor compression system, the feedforward controller produces a second control signal 312 based on a function of the first control signal. To that end, the embodiments can include a circuitry to control the vapor compression system based on the first control signal and to control the radiant system based on the second control signal.

For example, the first control signal 311 is processed by a low-pass filter 360 to attenuate the high-frequency components in 311, due to the recognition that the response of the building space temperature to a change in the input to the radiant system is slower than the comparable change in building space air temperature resulting from a change to the compressor frequency 351. The resulting low-frequency signal 312 that is generated by the low-pass filter 360 is then input to a compensator 361, which computes the input to the radiant system 362 that achieves stable operation with no air temperature overshoot.

The low-pass filter 360 separates the frequency responses of the radiant system with dynamics slower than the dynamics of the vapor compression system. In one embodiment, the low-pass filter 360 is a second-order filter with a continuous-time transfer function $$L(s) = \frac{k}{\left(1 + \frac{s}{\omega}\right)}$$

where k is the steady-state gain that is set to determine the percentage of heating or cooling contribution from the radiant system in the steady-state, $\omega=2\pi/T$ is the bandwidth, and T is the time constant. In some implementations, k=0.75 and T=2-4 hours. The low-pass filter can discretized in time for realization in a computer using methods commonly known to the field.

The compensator 361 is a stable filter with frequency response T2/T1, where T1 is a low-order, minimum phase approximation of the frequency response of the radiant system from input 362 to building space air temperature 382, and T2 is a low-order approximation of the frequency response of the vapor compression system from compressor speed input 331 to building space air temperature 382. The input 362 to the radiant system 370 can be one or combination of a pump speed, a value position or adjustable inlet water temperature. The input 362 is applied to the radiant system 370, which provides a second quantity of thermal energy 371 that is added to or removed from the building space 380.

In different embodiments, the frequency responses T1 and T2 are computed using a simulation model of the vapor compression system, the radiant system and the conditioned space, and/or identified from data obtained from a system identification experiment such as a step response. In one embodiment, the vapor compression system and the radiant system are each third-order linear systems, so that the compensator 361 is a sixth-order linear system, which may be discretized for discrete-time realization in a computer using methods commonly known to the field. Uncertainty in T1 and T2, caused by the low-order approximation or variation in the building space due to changes in the weather, use of the space etc., is compensated by feedback 382, to ensure that the overall system works together to give a stable temperature regulation without overshoot.

The structure of the interactions between the individual controllers 310 and 320 considers that the underlying structure of the heat pump controller 310 is similar to that of a standalone heat pump. If this heat pump operates by itself, it would function as expected without any other modification to take advantage form legacy heat pump systems. In the case that the heat pump is installed without a radiant system, the input 312 is set to zero, and the standalone heat pump would function as expected. On the other hand, if the additional radiant system is installed, the radiant system is connected to the output 311, and the low-frequency signal 312 from the radiant system controller is added as an input to the heat pump controller. This modularity is an attractive feature of this system architecture.

Additionally or alternatively, some embodiment can include additional elements of a circuitry to control the vapor compression system based on the first control signal. For example, when the signal 311 is filtered by the low-pass filter 360, the second control signal 312 is a low-frequency control signal. In one implementation, the circuitry includes a subtractor 335 to subtract the low-frequency control signal from the first control signal to produce a high-frequency control signal 331 and to control the vapor compression system according to the high-frequency control signal. This implementation takes advantage of different dynamics of the system to reduce the duplication of the control while ensuring the correlated operation.

Figure 4:
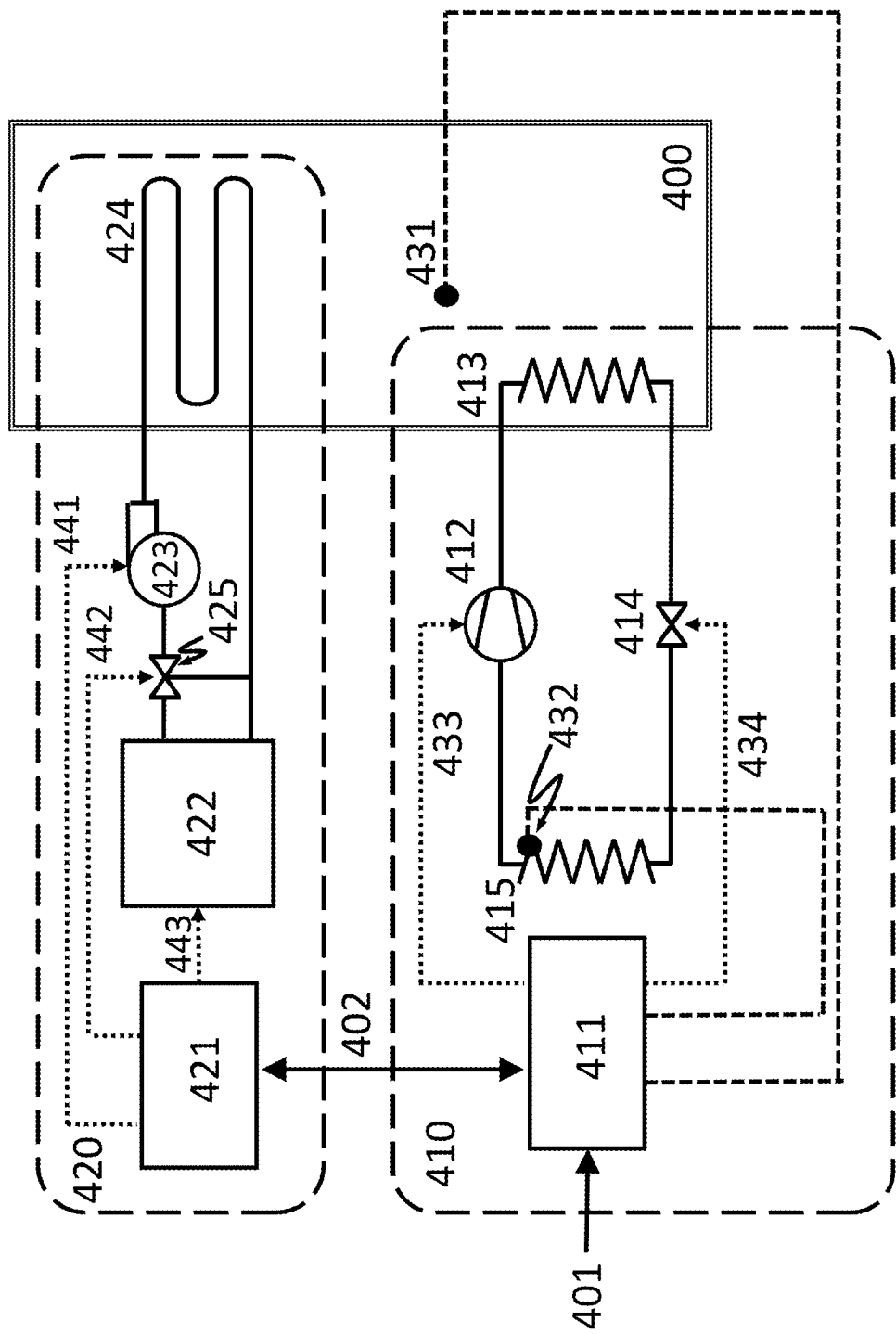
FIG. 4 shows a component-wise model of an building space with both a heat pump system and a radiant system according to some embodiments.

FIG. 4 shows a component-wise model of an building space (400) with both a heat pump system (410) and a radiant system (420) according to some embodiments. The user-specified building space temperature set-point 401 is provided to the heat pump controller 411, and that controller is designed to regulate the compressor speed 412 via signal 433, as well as regulate the position of the expansion valve 414 via signal 434. In this embodiment, the indoor heat exchanger 413 for the heat pump system provides thermal energy to the building space, and the outdoor heat exchanger 415 absorbs thermal energy from the ambient environment. The internal structure of the controller 411 is contained in block 310 from FIG. 3, while the measurements that the controller obtains from the system include the building space air temperature 431 and the evaporator superheat temperature 432. The controller 411 also exchanges information with the controller 421 for the radiant system. This information exchange corresponds to arrows 311 and 312 from FIG. 3.

In the radiant system 420, during a heating operation, the water heating system 422 provides thermal energy to the water, and this warm water passes through mixing valve 425 and is pumped into the radiant system via pump 423. The water then passes through the tubes 424 of the radiant heating system, and the return water is either mixed with the warm water or returns to the heating system. In different implementations, the radiant system controller 421 is designed to regulate the position of the mixing valve 425 to control the inlet water temperature for the tubes that comprise the radiant heating system, and/or the speed of the pump 423 and the behavior of the water heating system 422. Some implementations of this controller operates with constant pump speed and on/off behavior for the heating system, and controls the inlet water temperature for the radiant heating tubes by using the mixing valve to adjust the ratio of warm water delivered by the water heater to the cooler water returned from the radiant heating system. Alternative embodiments of this system involve variable speed control of the pump, as well as variable control of the heating system, for example when a water-source heat pump is used for a water heater instead of a traditional fossil fuel-fired heater. In cooling operation, the system operates analogously with the water heating system 422 replaced by a water cooling system, such as a chiller.

Figure 5:
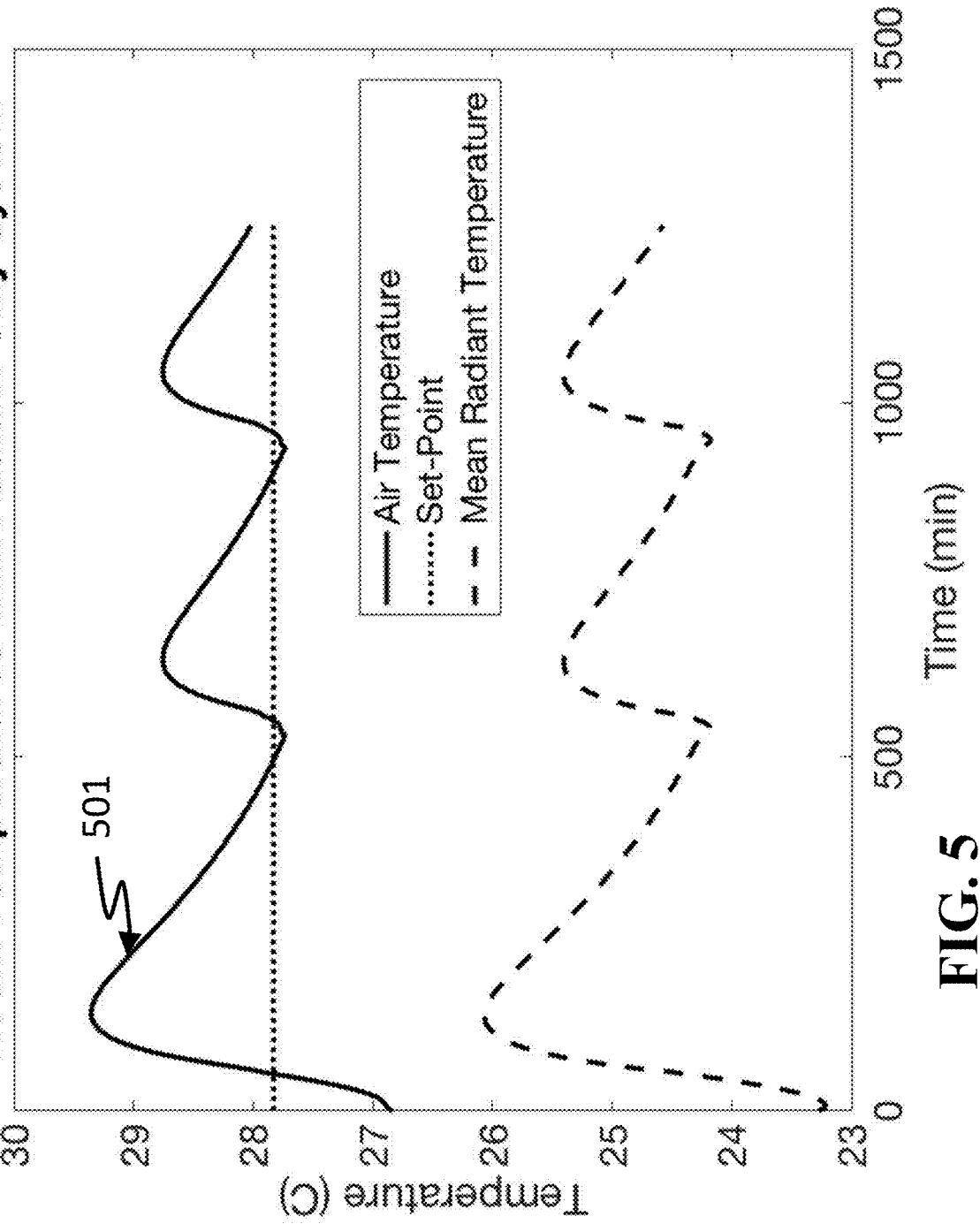
FIG. 5 shows a graph illustrating an exemplar time response of a radiant-only system to a set-point increase.

FIG. 5 shows a graph illustrating an exemplar time response of a radiant-only system to a set-point increase. FIG. 5 show the slow response and set-point overshoot (501) in the exemplar time response.

Figure 6:
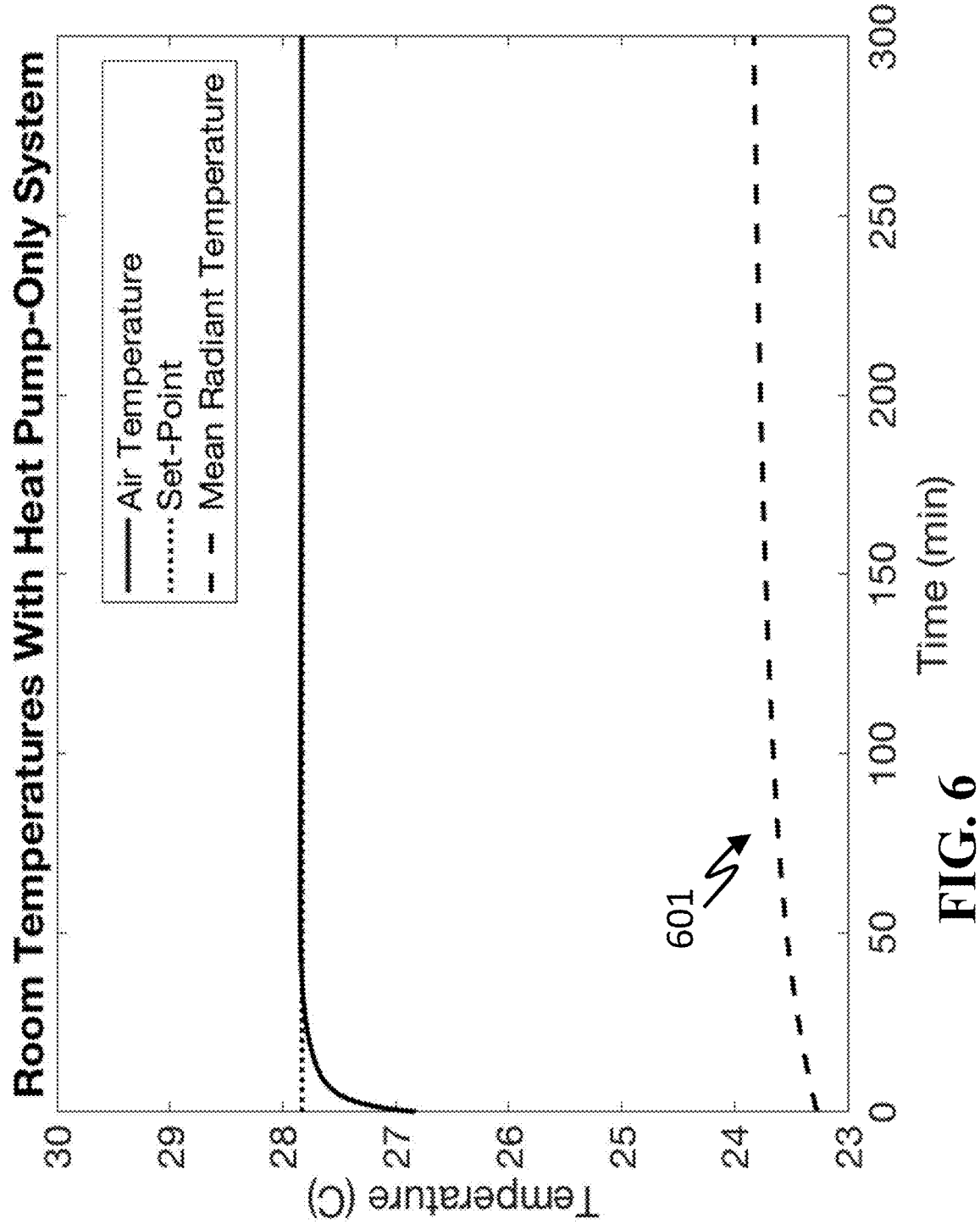
FIG. 6 shows a graph illustrating an exemplar time response of a building space that uses only a vapor compression system.
Figure 7:
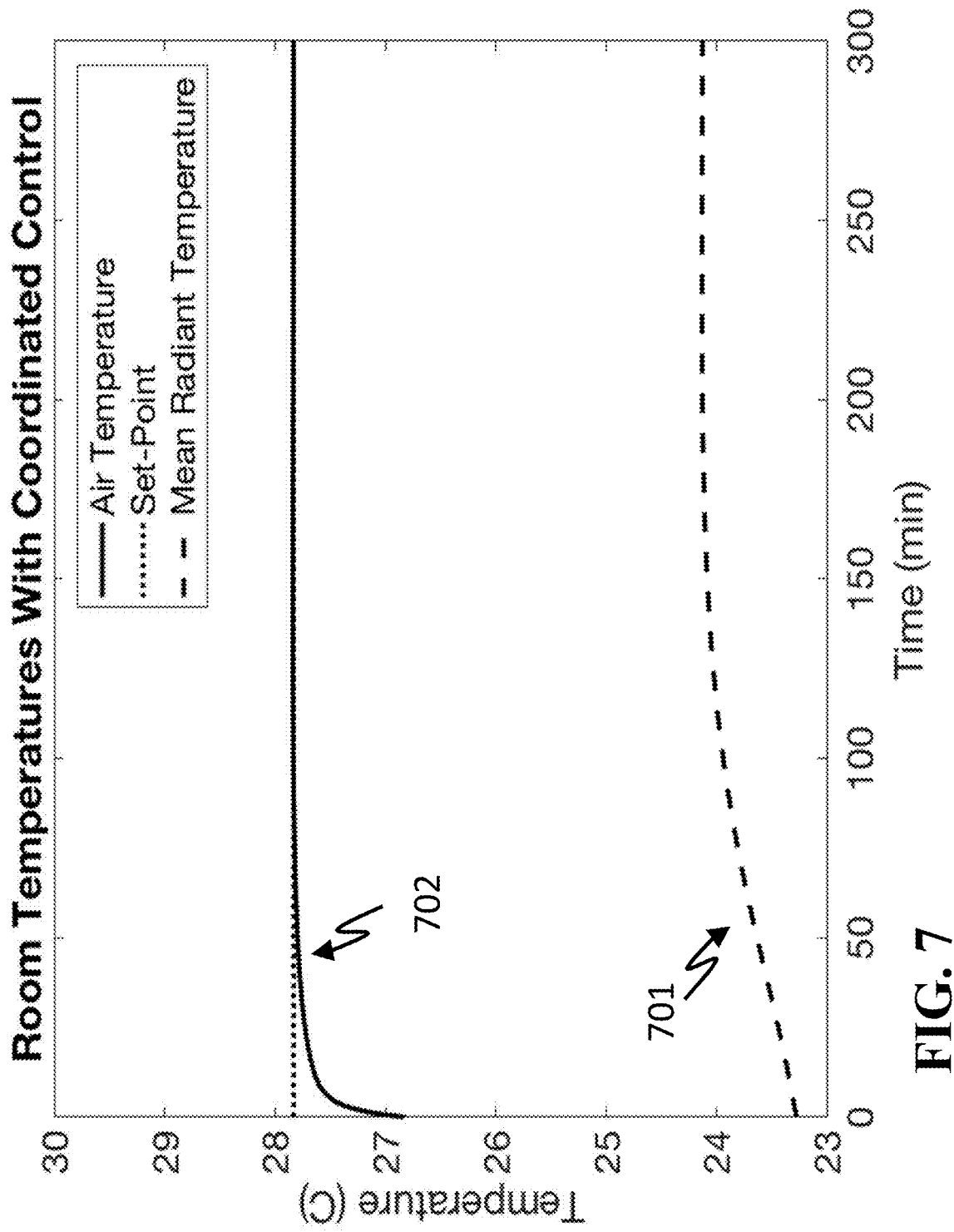
FIG. 7 provides an example time response to an increase in a set-point achieved by a thermal comfort system according to some embodiments.

FIG. 6 shows a graph illustrating an exemplar time response of a building space that uses only a vapor compression system to a set-point increase 601, showing a fast response to the air temperature, but a very slow response in mean radiant temperature FIG. 7 provides an example time response to an increase in a set-point achieved by a thermal comfort system according to some embodiments. There is no temperature overshoot (702) while the mean radiant temperature response (701) is faster than it would be using the system with only a vapor compression system, (601) shown in FIG. 6.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated electrical circuits, with one or more processors in an integrated circuit component. Though, a processor may be implemented using electrical circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A thermal conditioning system for controlling a thermal comfort of an occupant of an environment in a building, comprising:
   a vapor compression system configured to control an air temperature in the environment;
   a feedback controller configured to generate a first control signal for controlling a state of the vapor compression system to reduce an error between a set-point air temperature and a current air temperature in the environment;
   a radiant system configured to control a radiant temperature in the environment; and
   a feedforward controller configured to generate a second control signal as a function of the first control signal for controlling a state of the radiant system based on the state of the vapor compression system.

2. The thermal conditioning system of claim 1, wherein the first control signal defines a movement of refrigerant in the vapor compression system, wherein the second control signal defines a radiant heat transfer of the radiant system in proportion to the movement of the refrigerant.

3. The thermal conditioning system of claim 2, wherein the feedforward controller comprises:
   a low-pass filter to filter the first control signal, such that the second control signal is a low-frequency control signal.

4. The thermal conditioning system of claim 3, wherein the feedforward controller comprises:
   a compensator to produce control inputs to the radiant system, wherein the compensator is a stable filter with a frequency response indicative of a ratio of frequencies responses of the radiant system and the vapor compression system.

5. The thermal conditioning system of claim 4, wherein the feedforward controller comprises:
   a subtractor to subtract the low-frequency control signal from the first control signal to produce a high-frequency control signal and to control the vapor compression system according to the high-frequency control signal.

6. The thermal conditioning system of claim 4, wherein the low-pass filter is a second-order filter, and the compensator is a six-order liner system.

7. The thermal conditioning system of claim 1, wherein the feedback controller performs a close loop control of the environment based on feedback measurements of temperature in the environment, and wherein the feedforward controller performs an open loop control of the environment only based on the outputs of the feedback controller.

8. The thermal conditioning system of claim 1, wherein the feedback controller a proportional-integral-derivative (PID) controller.

9. The thermal conditioning system of claim 1, wherein the vapor compression system comprises:
   a compressor having a varying speed for compressing and pumping refrigerant through the vapor compression system; and
   an expansion valve for providing an adjustable pressure drop between a high-pressure portion and a low-pressure portion of the vapor compression system, wherein the feedback controller produces the first control signal for the vapor compression system defining one or combination of the speed of the compressor and an opening of the expansion valve.

10. The thermal conditioning system of claim 9, wherein the radiant system is a hydronic radiant heating and cooling system comprising:
pipes for passing liquids embedded in a wall of the building forming at least part of the environment; and
a pump operated by a motor for pumping the liquids through the pipes, wherein the feedforward controller produces the second control signal for the radiant system including the speed of the motor in proportion to one or combination of the speed of the compressor and the opening of the expansion valve.

11. A thermal conditioning method for controlling a thermal comfort of an occupant of an environment in a building, comprising:
generating a first control signal for controlling a state of a vapor compression system to reduce an error between a set-point air temperature and a current air temperature in the environment;
generating a second control signal control for controlling a state of the radiant system based on a function of the first control signal; and
controlling concurrently a vapor compression system to control an air temperature in the environment based on the first control signal and a radiant system to control a radiant temperature in the environment based on the second control signal.

12. The method of claim 10, wherein generating the first control signal comprises:
receiving the set: point air temperature;
measuring the current air temperature in the environment;
determining the error between a set: point air temperature and a current air temperature in the environment; and
determining the first control signal based on a weighted sum of a proportional, integral, and derivative terms of the error.

13. The method of claim 11, wherein generating the second control signal comprises:
low-pass filtering the first control signal to produce a low-frequency control signal, such that the radiant system is controlled using the low-frequency control signal.

14. The method of claim 13, further comprising:
filtering the low-frequency control signal with a stable filter having a frequency response indicative of a ratio of frequencies responses of the radiant system and the vapor compression system.

15. The method of claim 13, further comprising:
subtracting the low-frequency control signal from the first control signal to produce a high-frequency control signal, such that the vapor compression system is controlled using the high-frequency control signal.

* * * * *